United States Patent [19]
Yoshida et al.

[11] Patent Number: 5,671,096
[45] Date of Patent: Sep. 23, 1997

[54] VANITY MIRROR

[75] Inventors: Yoshihide Yoshida, Shimizu; Atsushi Yamada, Tokyo, both of Japan

[73] Assignee: Koito Manufacturing Co., Ltd., Tokyo, Japan

[21] Appl. No.: 506,525

[22] Filed: Jul. 25, 1995

[30] Foreign Application Priority Data

Jul. 30, 1994 [JP] Japan .................................. 6-197410

[51] Int. Cl.$^6$ .................................................. B60J 3/00
[52] U.S. Cl. ........................... 359/844; 359/872; 362/135; 362/136
[58] Field of Search .................. 359/844, 872; 362/135, 136, 142; 296/96.1, 97.6

[56] References Cited

U.S. PATENT DOCUMENTS

| 4,909,562 | 3/1990 | Sakuma et al. . | |
|---|---|---|---|
| 5,003,438 | 3/1991 | Yoshida | 362/135 |
| 5,022,699 | 6/1991 | Yoshida . | |
| 5,029,052 | 7/1991 | Sakuma et al. . | |
| 5,117,337 | 5/1992 | Sakuma . | |
| 5,184,888 | 2/1993 | Sakuma et al. | 362/135 |
| 5,205,639 | 4/1993 | White et al. | 362/137 |
| 5,207,501 | 5/1993 | Sakuma et al. . | |
| 5,267,090 | 11/1993 | Dowd et al. | 359/844 |
| 5,355,254 | 10/1994 | Aymerich et al. | 359/844 |
| 5,357,376 | 10/1994 | Yoshida | 359/844 |

*Primary Examiner*—Timothy P. Callahan
*Assistant Examiner*—T. Lam
*Attorney, Agent, or Firm*—Koda and Androlia

[57] ABSTRACT

A vanity mirror including: a mirror body arranged with a mirror; a cover turnably received by the mirror body so that it may be opened/closed relative to the mirror; and spring means for urging the cover in at least the closing direction. A shaft is fixedly received by one of the mirror body and the cover for receiving the other and is formed with a friction surface part having an enlarged coefficient of friction on the surface to be brought into sliding contact with the other.

11 Claims, 9 Drawing Sheets

VANITY MIRROR

BACKGROUND OF THE INVENTION

1. Field of the Invention

The present invention relates to a vanity mirror to be attached to an automobile or the like and, more particularly, to a vanity mirror having a cover for protecting its surface.

2. Related Art

Figure 11:
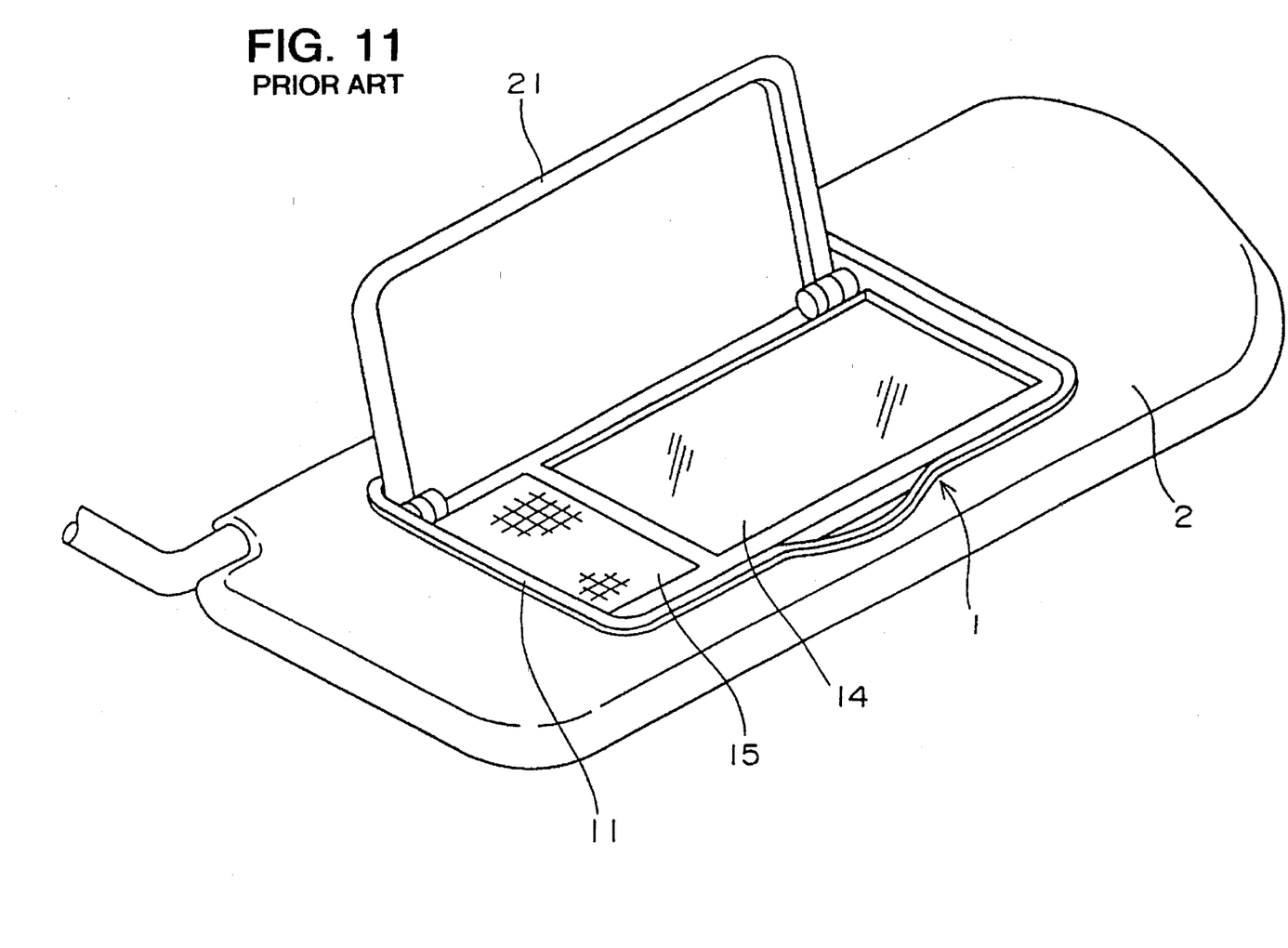
FIG. 11 is a perspective view showing the exterior of one example of a vanity mirror to which the present invention is applied.

Generally, a vanity mirror is attached to a sun visor which is mounted at the driver's or passenger's seat of automobiles. The vanity mirror is constructed to have an openable cover to prevent a mirror surface from being exposed at all times and to protect the surface. FIG. 11 is a schematic diagram showing the vanity mirror of this type. A vanity mirror 1 is attached to an inner face of a sun visor 2 mounted on an automobile, i.e., a face which will confront the passenger when the sun visor 2 is turned downward.

The vanity mirror 1 is integrally equipped with an illumination part 15. Specifically, a mirror body 11 is molded of a resin and holds a horizontally elongated mirror 14 on one side thereof, and the illumination part 15 is disposed on the other side and adjacent to the mirror 14. On an upper end part of the mirror body 11, on the other hand, there is turnably supported by hinge mechanisms a cover 21 which can be manually opened and closed by turning the same. When the cover 21 is turned upward, the mirror 14 and the illumination part 15 are exposed and simultaneously the illumination part 15 is turned ON so that the passenger can use the vanity mirror 1 even in night time. The cover 21 is made of a resin and has a surface made of such a material as is identical to that of the surface of the sun visor, when desired.

Figure 12A:
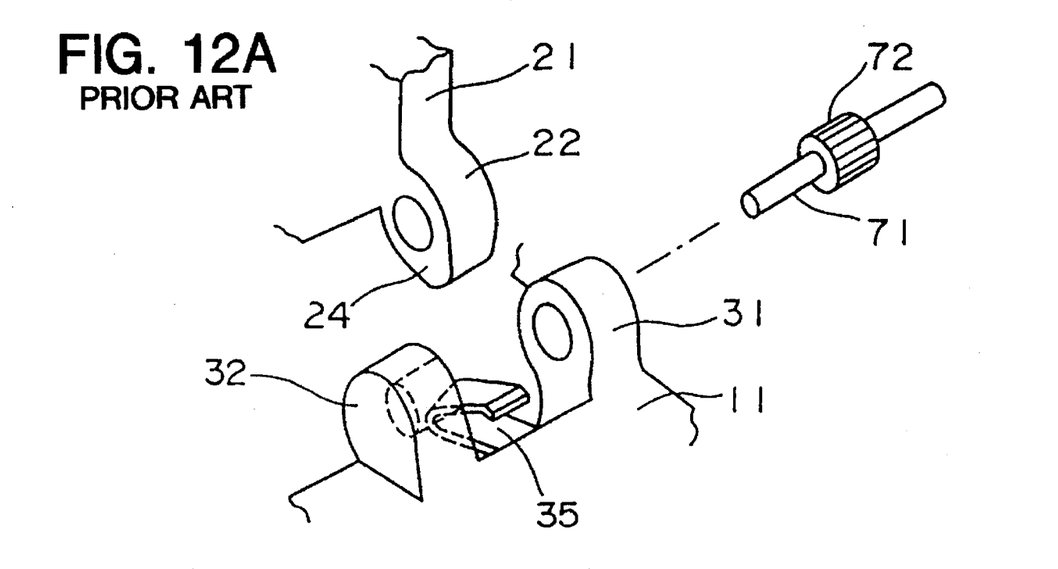
FIGS. 12A and 12B are a section showing a shaft receiving structure of a cover and a mirror body, respectively, of the conventional vanity mirror.
Figure 12B:
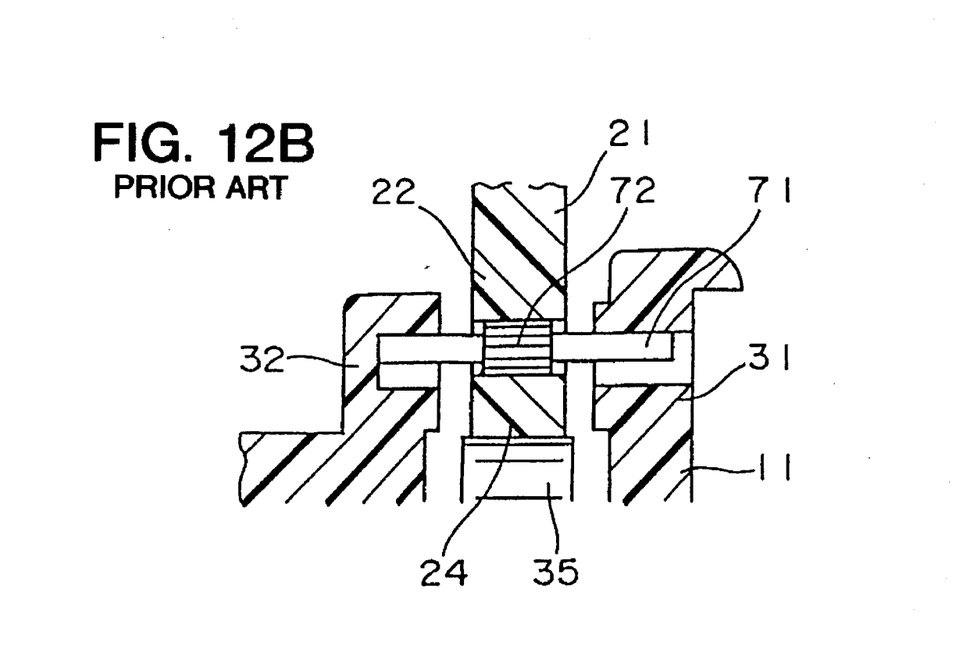

This vanity mirror is devised to keep a stable closed state of the cover 21 by making use of a spring force, for example, so that the cover 21 may take the closed state stably relative to the mirror body when the cover is closed. FIG. 12A is a perspective views showing one example of the construction of the device and 12B is a sectional view showing the assembled state of the construction. A shaft 71 is so fitted and fixed in each shaft receiving part 22 of the cover 21 that two end parts of which are turnably received in paired shaft receiving parts 31 and 32 which are formed at the mirror body 11. In this case, the shaft 71 is formed at an intermediate part with a serial part 72 which has its circumference knurled, and is unified with the shaft receiving part 22 by press-fitting the serial part 72 in the shaft receiving part 22 of the cover 21. Moreover, both end parts of the shaft 71 are fitted in the aforementioned shaft receiving parts 31 and 32.

On the other hand, the aforementioned shaft receiving part 22 has an outer circumference formed into a cam part 24, and a plate spring 35, which is bent to correspond to the cam part 24, is so received by the mirror body 11 as to elastically contact with the cam part 24. As a result, as the cover 21 is turned, the cam parts 24 of the shaft receiving parts 24 are accordingly turned to ride over the bent parts of the plate springs 35 thereby to establish spring forces. These spring forces can be used to hold the cover 21 snugly in its closed position and its open position, respectively.

If the vanity mirror thus constructed is designed to increase the spring forces of the plate springs 35, the force to bring the cover 21 into elastic contact with the mirror body 11 can be increased to improve the fully closed position of the cover 21 more stably. With this construction, however, the speed for turning the cover 21 in the closing direction is also increased by the increased spring forces of the plate springs 35 so that the cover 21 is vigorously turned to full closed position. At this time, the cover 21 impinges upon the mirror body 11 with a "bang" or impact, which may deteriorate the high quality of the vanity mirror.

With the spring forces of the plate springs 35 being reduced, on the other hand, the cover 21 can be opened and closed by a light force while eliminating the bang or impact at the closing time. However, the quality of the vanity mirror is also deteriorated because the cover 21 is hard to stably hold in the fully closed position and is partially open.

SUMMARY OF THE INVENTION

The present invention was made in view of the foregoing difficulties accompanying the conventional vanity mirror. Therefore it is an object of the present invention to provide a vanity mirror which is enabled to have a high grade or quality by reducing its cover closing speed to damp the bang or impact while enhancing the stability at the cover closing time.

According to the present invention, there is provided a vanity mirror in which a cover of a mirror body supporting a mirror is turnably supported and biased at least in its closing direction by spring member. A shaft is fixedly received by one of the mirror body and the cover, the other of which receives the shaft. The shaft is formed with a friction surface part which has friction coefficient enlarged on the face to come into sliding contact with the shaft hole of the other member.

Here, the friction surface part of the shaft may be formed into a circumference having a smooth face to contact with the other member of the mirror body and the cover, and the shaft per se may be made of a resin having a large coefficient of contact friction with the other member.

Since the friction coefficient between the mirror body or cover and the shaft is increased by the friction surface part formed on the shaft, the closing speed of the cover to be turned by the spring member is decelerated by the frictional force so that the bang or impact at the cover closing time is suppressed while improving the stability of the closing operation.

DESCRIPTION OF THE PREFERRED EMBODIMENTS

Figure 1:
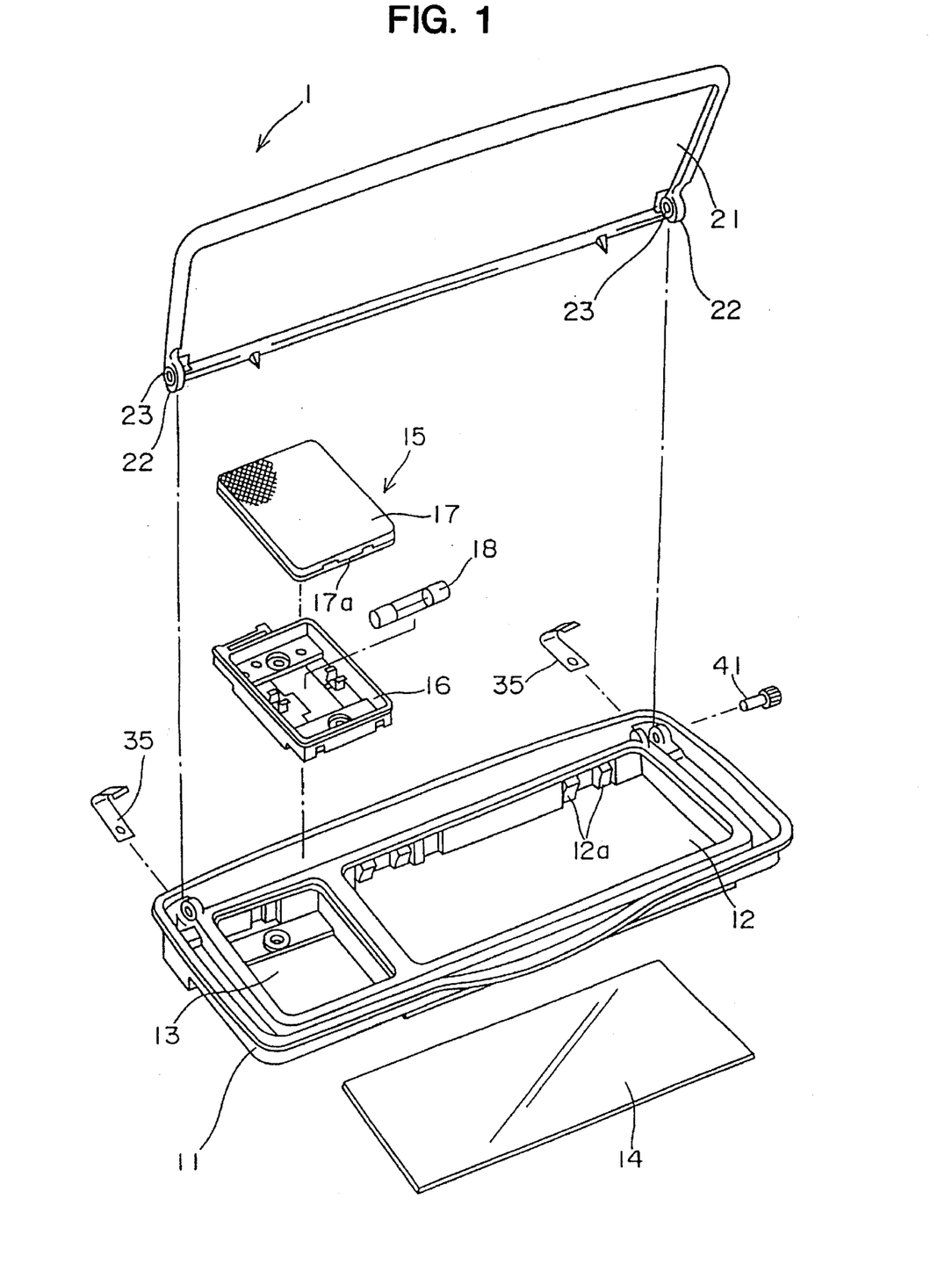
FIG. 1 is a partially exploded perspective view showing an essential portion of an embodiment in which a sun visor is arranged with a vanity mirror of the present invention.
Figure 2:
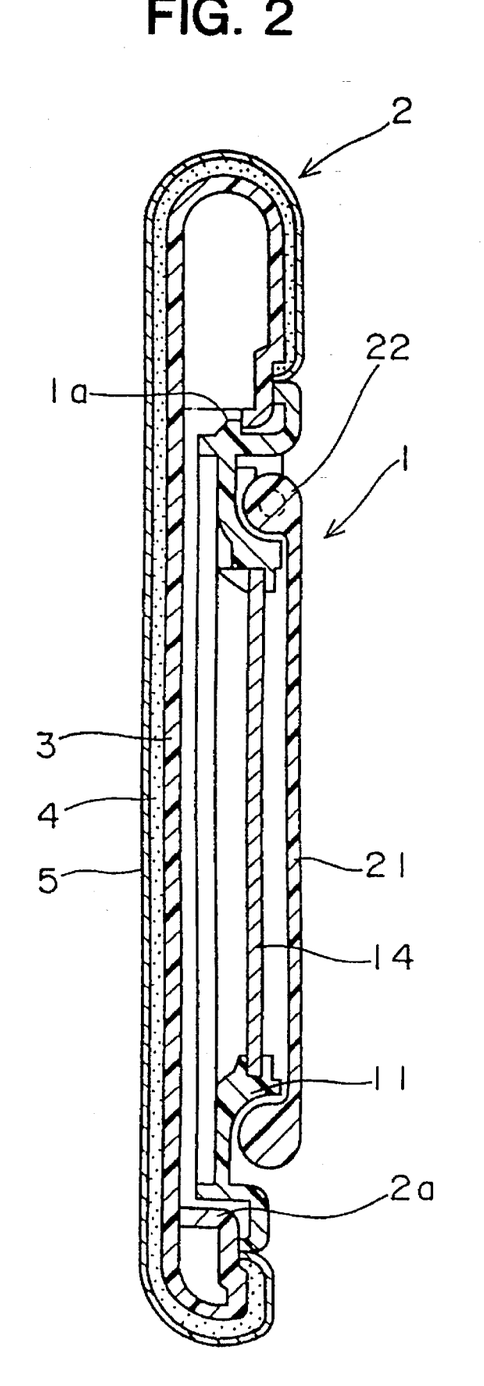
FIG. 2 is a longitudinal section showing an assembled state of FIG. 1.

The present invention will be described in connection with its embodiments with reference to the accompanying drawings. FIG. 1 is a partially exploded perspective view showing one embodiment of the vanity mirror of the present invention. A sectional structure of the state, in which a vanity mirror 1 is assembled in a sun visor 2, is shown in FIG. 2. Further, the exterior of the assembled state is similar to the aforementioned one of FIG. 11. In FIG. 2, the sun visor 2 is formed in an inner face with a shallow recess 2a which is shaped into such an rectangle as to receive the vanity mirror 1, and the vanity mirror 1 is fitted in that recess 2a and fixed on the sun visor by screws or insertion member. Here, the vanity mirror 1 is fixed by means of lances 1a formed thereon. The sun visor 2 is prepared by covering a core 3 made of a resin with a cushion member 4 and by coating this cushion member 4 with a sheet member 5, and the aforementioned lances 1a are fitted in the core 3.

As shown in FIG. 1, the vanity mirror 1 is mainly constructed of a mirror body 11 molded of a resin. In the mirror body 1, a horizontally elongated large rectangular window 12 and a smaller rectangular window 13 are juxtaposed to each other. The larger rectangular window 12 is formed on the back with a plurality of lances 12a which are so formed integrally with the mirror body 11 as to face open edge parts of the window 12, so that the mirror 14 has peripheral edge parts retained and received by the aforementioned lances 12a. On the other hand, an illumination part 15 is fixedly received by the smaller rectangular window 13. In this embodiment, the illumination part 15 includes a shallow-dished rectangular illumination box 16 and a lens 17 to be fitted in the illumination box 16. The illumination box 16 is fixed in the mirror body 11 by means of screws to receive an in-line type illumination lamp 18, and the lens 17 is retained in the opening of the illumination box 16 by means of lances 17a.

Figure 3A:
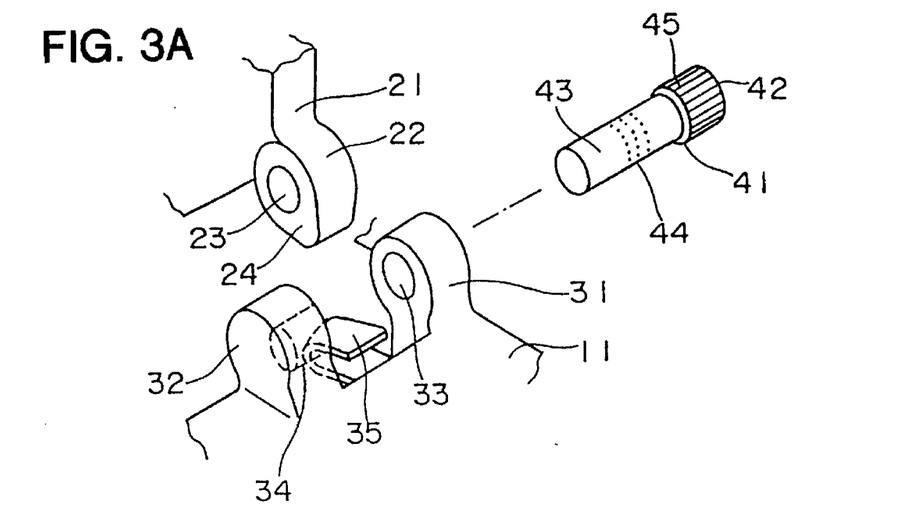
FIGS. 3A, 3B and 3C represent a partially exploded perspective view showing an essential portion of a structure for receiving a cover in a mirror body and sectional front elevation and side elevation of the assembled state of the structure, respectively.
Figure 3B:
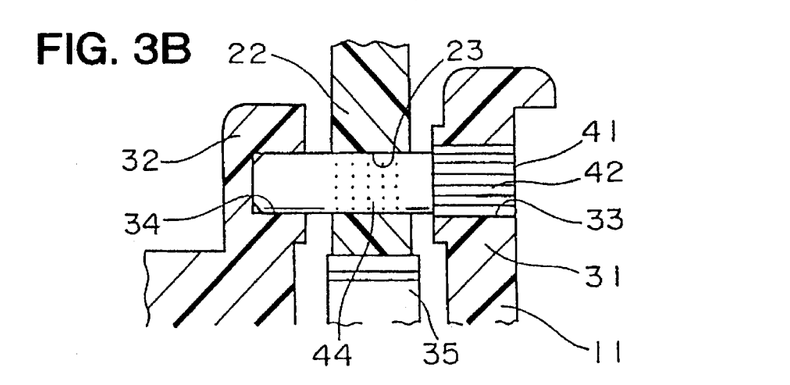

In order to cover the surface of the aforementioned mirror body 11, i.e., the mirror 14 and the illumination part 15, on the other hand, there is prepared a sheet-shaped cover 21 which is formed to have a size substantially equal to that of the mirror body 11. The cover 21 is turnably received at the two side parts of the upper end edge of the mirror body 11. Here, the cover 21 is molded of an ABS, PC or PP resin. FIG. 3A is a partially exploded perspective view showing an essential part of the cover. The cover 21 is integrally formed at the two end parts of its upper edge with shaft receiving parts 22 which are individually formed generally into discs, and each shaft receiving part 22 is formed with a shaft hole 23 for receiving a shaft. Moreover, the shaft receiving part 22 has an outer circumferential part partially protruded to form a cam part 24.

On the other hand, the aforementioned mirror body 11 is integrally formed at each side part of an upper end with a pair of shaft receiving parts 31 and 32 which are positioned to hold the shaft receiving part 22 of the aforementioned cover 21 at two inner and outer sides. These shaft receiving parts 31 and 32 are respectively formed with shaft holes 33 and 34 for receiving a later-described shaft 41. In this case, the shaft hole 34 is blinded to prevent the deterioration of appearance, which might otherwise be caused by the exposure of the leading end part of the shaft 41, as will be described hereinafter. Between these shaft receiving parts 31 and 32, moreover, there is arranged a plate spring 35 which is bent in a shape like a letter "V". The plate spring 35 has a longer part 35a fitted in a groove 19 formed in the mirror body 11 so that it is fixedly received by the mirror body 11. The shorter part 35b of the plate spring 35 is so interposed between the aforementioned shaft receiving parts 31 and 32 as to have an elasticity in the direction of the thickness.

The aforementioned shaft 41 is formed by working a metallic material or a resin material such as polyacetal processing into a round rod having substantially the same diameter as the internal diameter of the shaft holes 23, 33 and 34 formed in the aforementioned shaft receiving parts 22, 31 and 32, respectively. The shaft 41 has a base end part radially increased to have a large-diameter part 42 knurled at 45 on an outer circumference thereof. The intermediate part 43 of the shaft 41 has a circumference embossed to provide a friction surface part 44 having fine corrugations.

Figure 3C:
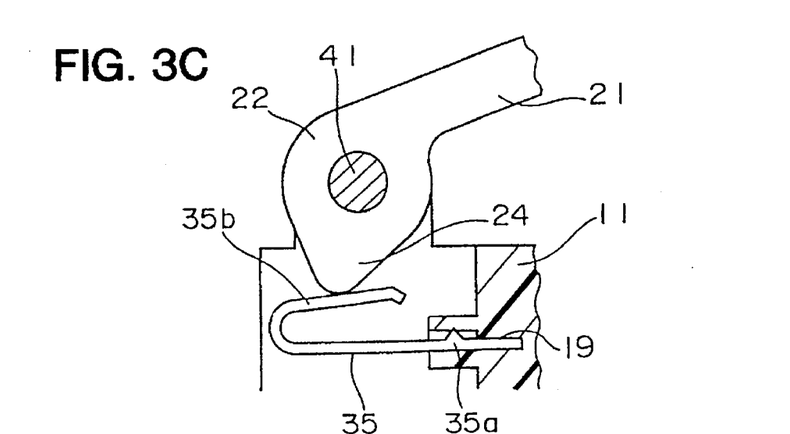

As shown in sectional front and side elevations of the assembled state in FIGS. 3A and 3C, with the shaft receiving part 22 of the cover 21 being positioned between the paired shaft receiving parts 31 and 32 of the mirror body 11, the shaft 41 has a leading end part inserted sequentially into the individual shaft holes 33, 23 and 34 of the outer, intermediate and inner shaft receiving parts 31, 22 and 32. Finally, the large-diameter part 42 of the shaft 41 is press-fitted in the shaft hole 33 of the outer shaft receiving part 31 so that knurl bites the inner face of the shaft receiving part 31. As a result, the shaft 41 is unified with the mirror body 11. During the press-fitting operation, moreover, the friction surface part 44 of the shaft 41 is inserted into the shaft hole 23 of the shaft receiving part 22. As a result, the shaft receiving part 22 of the cover 21 receives the shaft 41 to turn relative to the mirror body 11. At this time, the cam part 24 of the shaft receiving part 22 is held in elastic contact with the shorter part 35b of the plate spring 35.

Incidentally, the aforementioned illumination part 15 is equipped with the not-shown switch mechanism which is actuated, when the cover 21 is opened to a predetermined position, to turn on the illumination part 15, although the description will be omitted.

According to this construction, the cover 21 can be turned on the shaft receiving part 22 and the shaft 41, when it is manually actuated by the passenger, so that it can be opened and closed relative to the mirror body 11. Since, at this time, the shaft 41 is integrally received at a large-diameter part 42 in the mirror body 11, the cover 21 has a shaft receiving part 22 turned relative to the shaft 41 so that it is opened and closed. In these opening/closing operations of the cover 21, moreover, the closing force is applied to the cover 21 by an elastic force at the time when the cam part 24 of the shaft receiving part 22 abuts against the bent plate spring 35, so that the cover 21 is held in fully closed position by the spring force of the plate spring 35.

When the cover 21 is turned in the opening direction, on the other hand, the cover 21 causes the cam part 24 of the shaft receiving part 22, when in a predetermined turned position, to ride over the plate spring 35. When the predetermined position passes, the elastic force is applied in the reverse direction to the cover 21 so that the cover 21 can be held in the open position even if it is released from the hand of the passenger.

If the spring force of the plate spring 35 is enhanced, therefore, the force for holding the open/closed position of the cover 21 by the plate spring 35 can be enhanced to intensify the force for bringing the leading end part of the cover 21 into elastic contact with the mirror body 11, when the cover 21 is fully closed, so that the snugness of the fully closed position of the cover can be enhanced to improve the quality of the vanity mirror. Moreover, the cover 21 can be held in the fully open position. On the other hand, the shaft receiving part 22 of the cover 21 is made turnable to have a shaft hole 23 internally contacting with the friction surface part 44 which is formed in the intermediate part 43 of the shaft 41, so that the frictional resistance between the inner face of the shaft hole 23 and the friction surface part 44 is increased. When the shaft receiving part 22 is turned along the circumference of the shaft 41 as the cover 21 is opened or closed, the rate for the cover 21 to be turned in the closing direction is decreased although the spring force of the plate spring 35 is increased.

As a result, when the cover 21 comes into the fully closed position, the cover 21 can be prevented from impinging upon the mirror body 11 at a high speed, to prevent the bang or impact so that a high quality can be achieved in the vanity mirror. Especially in a case where the shaft 41 is made of polyacetal, not only the sliding property but also the wear resistance can be enhanced against the ABS, PC or PP resin making the cover 21, so that a high reliability for a long time period can be retained even for the repeated operations to open and close the cover.

Here in the embodiment described above, the friction surface part 44 of the shaft 41 is embossed. However, the friction surface part 44 may be formed with a smooth circumference without any such working such as the embossing, if the shaft 41 is made of one of the above-specified resins and set to have an external diameter proper for establishing a frictional force between itself and the inner face of the shaft hole 23 of the shaft receiving part 22 of the cover. Then, no working process is required for forming the friction surface part, but what is required is to mold the shaft of a resin so that the shaft can be easily manufactured.

Figure 4A:
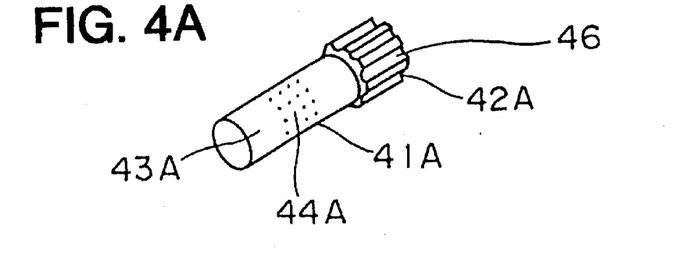
FIGS. 4A and 4B present a perspective view of a shaft of a second embodiment and a section of the assembled state of the shaft, respectively.
Figure 4B:
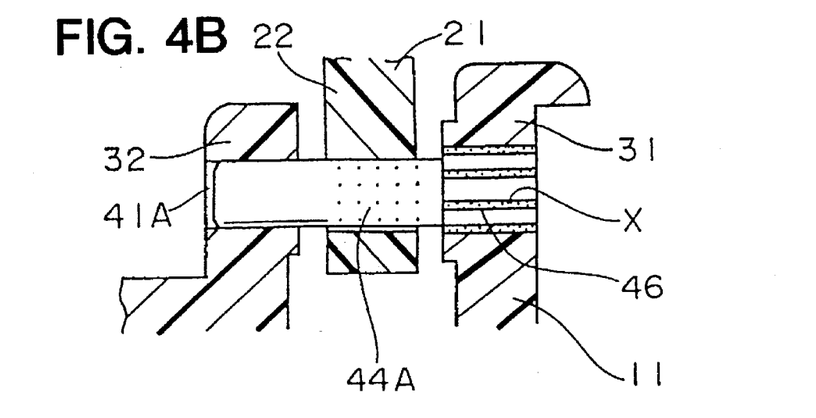

One modification of the afore-mentioned shaft will be described. FIG. 4A shows a shaft 41A in which a base end part has a large-diameter part 42A formed in a circumference with a plurality of axial depression grooves 46. Moreover, the intermediate part 43A of the shaft 41A has a circumference embossed with corrugations to provide a friction surface part 44A. As shown in FIG. 4B, moreover, the shaft 41A is inserted into the shaft receiving parts 31 and 32 and the shaft receiving part 22, and an adhesive X is injected through the depression grooves 46 into the outer shaft receiving part 31, so that the large-diameter part 42A can be adhered and fixed in the shaft hole of the outer shaft receiving part 31. The rate to close the cover 21 is decreased as in the foregoing embodiment by the friction surface part 44A formed on the intermediate part 43A of the shaft 41A. In this modification, further, the shaft hole 34 of the shaft receiving part 32 is formed as a through hole so that it can be more easily worked than the case in which it is blinded.

Figure 5A:
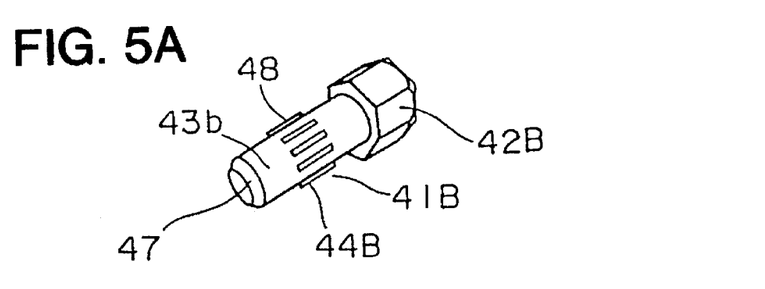
FIGS. 5(a)–(b) presents a perspective view of a shaft of a third embodiment, and a section of the assembled state of the shaft.
Figure 5B:
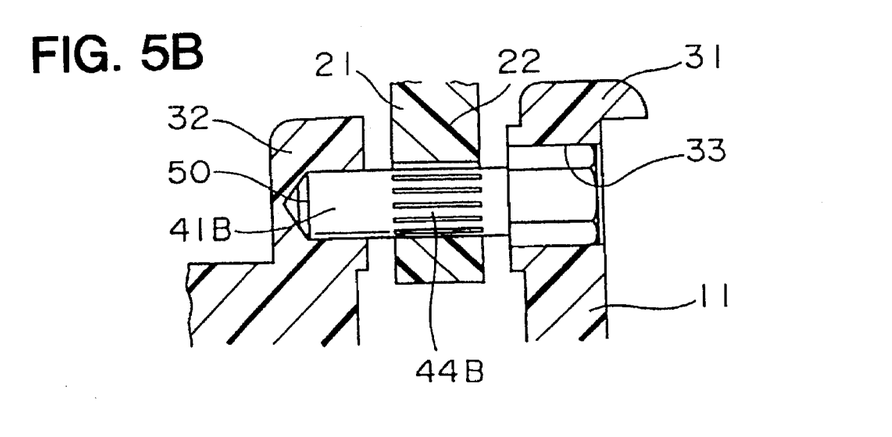

FIG. 5A shows a modification in which a large-diameter part 42B to be made at the base end portion of a shaft 41B is formed into a polygon such as a hexagon having a larger diagonal size than that of the shaft diameter and in which the intermediate part 43B of the shaft 41B is formed on a circumference with axial ridges 48 to provide a friction surface part 44B. The shaft 44B can be unified with the mirror body 11, as shown in FIG. 5B, by fitting the large-diameter part 42B of the shaft 41B in the shaft hole 33 of the outer shaft receiving part 31 of the mirror body 11 and by using the polygonal deformation of the large-diameter part 42B. Moreover, the shaft receiving part 22 of the cover 21 to turnably receive that shaft 41B has a friction coefficient increased when turned, because the shaft hole 23 has an inner face held in contact with the friction surface part 44B formed of the axial ridges 48. As a result, like the foregoing embodiments, the cover 21 can be closed at a low rate by the frictional force between the shaft receiving part 22 of the cover and the friction surface part 44B of the shaft 41B, so that the vanity mirror can be given a high quality. In this embodiment, moreover, the blind shaft hole 34 has a bottom formed into a conical surface, and the shaft 41B has a leading end part formed with a surface chamfered part 47, so that the shaft 41B can be easily centered with the shaft hole 34 by the abutting contact between the surface chamfered part 47 and the conical surface.

Figure 6A:
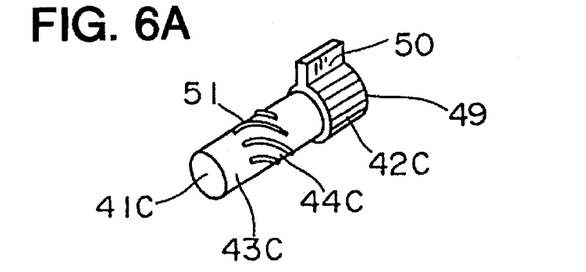
FIGS. 6A and 6B represent a perspective view of a shaft and a section of the assembled state of the shaft, respectively, of a fourth embodiment.
Figure 6B:
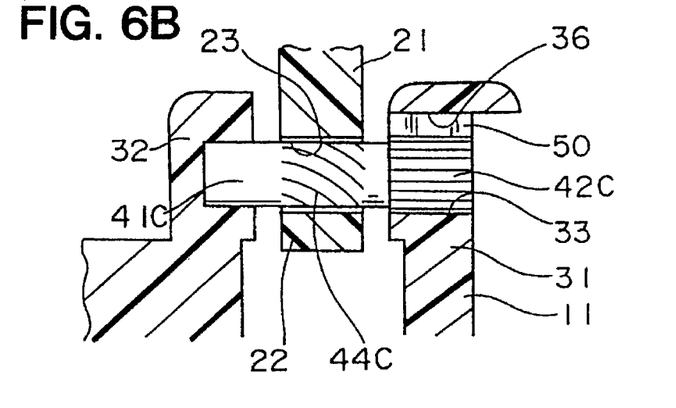

In FIG. 6A, a large-diameter part 42C formed at the base end part of a shaft 41C is knurled at 49 in a circumference and is partially protruded in a radial direction to form a key 50. Moreover, the intermediate part 43C of the shaft 41C is formed on a circumference with helical ridges 51 to provide a friction surface part 44C. As shown in FIG. 6B, therefore, the shaft 41C can be fixedly received by the mirror body 11 by forming a key 36 in the shaft hole 32 of the outer shaft receiving part 31 of the mirror body and by press-fitting the large-diameter part 42C in the shaft hole 33 while fitting the key 50 of the large-diameter part 42C of the shaft 41C in the key 36. Further, the shaft 41C is inserted into the shaft hole 23 of the shaft receiving part 22 of the cover 21 so that the frictional force can be established in the turning motion of the cover 21 to close the cover 21 at a low rate by increasing the friction coefficient of the friction surface part 44C.

Figure 7A:
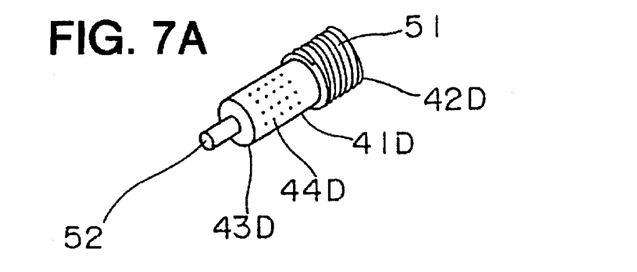
FIGS. 7A and 7B present a perspective view of a shaft and a section of the assembled state of the shaft, respectively, of a fifth embodiment.
Figure 7B:
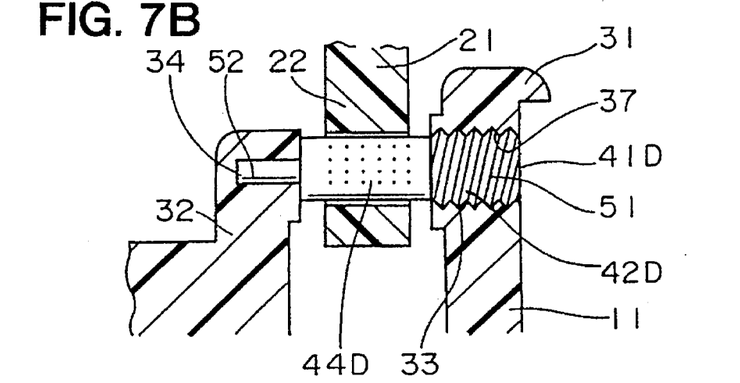

In FIG. 7A, a large-diameter part 42D formed at the base end part of a shaft 41D has a circumference threaded as at 51. Moreover, the intermediate part 43D of the shaft 41D has a circumference formed with embosses or ridges to provide a friction surface part 44D having a large friction coefficient. Moreover, the shaft 41D has a leading end part radially reduced from the intermediate part to form a small diameter part 52. If, therefore, the shaft hole 33 of the outer shaft receiving part 31 of the mirror body is threaded at 37 in the inner circumference, as shown in FIG. 7B, the shaft 41D can be fixedly received by the mirror body 11 by fastening the large-diameter part 42D of the shaft 41D in the thread 51 of the shaft hole 33. Since, at this time, the small diameter part 52 is formed at the leading end part of the shaft 41D, the shaft hole 34 of the inner shaft receiving part 32 of the mirror body 11 can be radially reduced according to the small diameter of the part 52 so that the external diameter of the inner shaft receiving part 32 can be reduced. Owing to the reduced external diameter of the inner shaft receiving part 32, the space to be occupied by the shaft receiving part 32 can be reduced to facilitate the arrangement of the afore-mentioned plate spring 35 thereby to reduce the size of the vanity mirror.

Figure 8A:
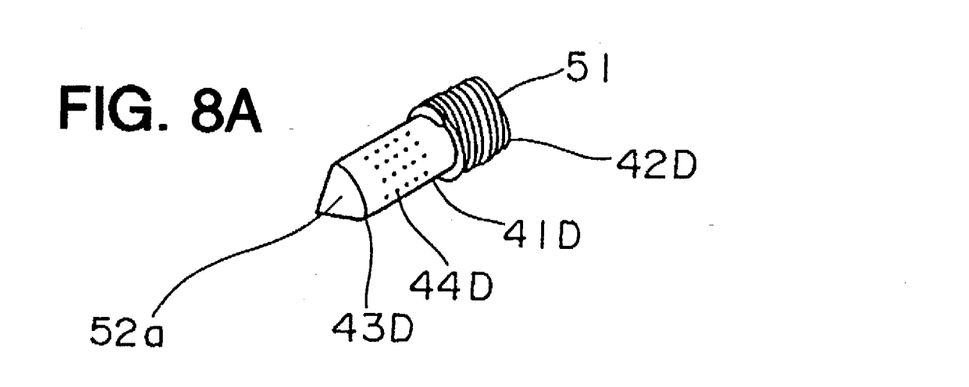
FIGS. 8A and 8B represent a perspective view of a shaft of a modification of the fifth embodiment and a section of the assembled state of the shaft, respectively.
Figure 8B:
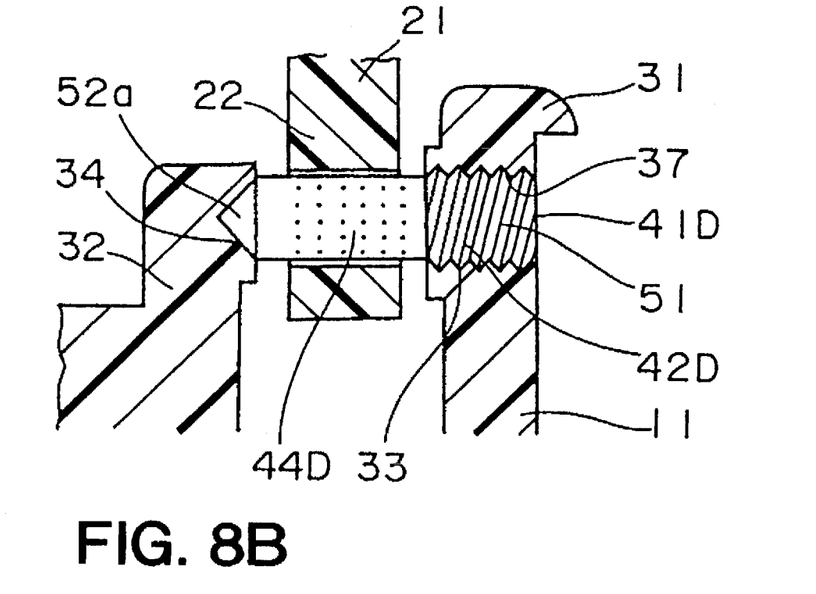

FIG. 8A shows a modification of the embodiment of FIG. 7. In this embodiment of FIG. 7, because of the provision of the small diameter portion 52, the corresponding portion cannot avoid more or less reduction in the strength. In the modification, therefore, the shaft 41D has the leading end part formed into a conical tapered part 52a. In a corresponding manner, on the other hand, the inner shaft receiving part 32 of the mirror body has the shaft hole 34 formed into a shallow conical recess. As a result, the tapered part 52a can come into abutment against the conically recessed shaft hole 34 so that the shaft 41D is received in the shaft hole 34, when the shaft is received in the shaft receiving parts 31 and 32.

Owing to this construction, the shaft hole 34 is not extended through the shaft receiving part 32 but is shallowed, so that the shaft receiving part 32 can have the radial size reduced as in the case of the construction of FIG. 7 while having the strength enhanced accordingly as the leading end part of the shaft 41D is not radially reduced.

Figure 9A:
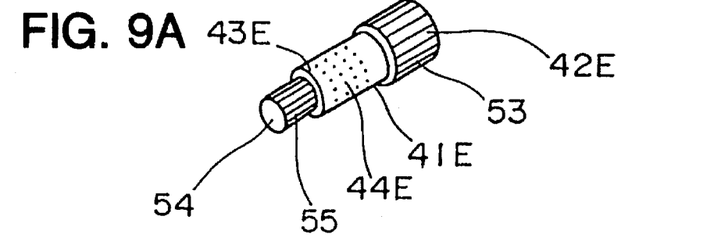
FIGS. 9A and 9B represent a perspective view of a shaft of a sixth embodiment and a section of the assembled state of the shaft, respectively.

In FIG. 9A, a large-diameter part 42E formed at the base end part of a shaft 41E has a circumference knurled at 53, and an intermediate part 43E is radially reduced at the leading end part to form a small diameter part 54, which has a circumference knurled at 55. Moreover, the intermediate part 43E of the shaft 41E has a circumference formed with the aforementioned embosses or ridges to form a friction surface part 44E having an enlarged friction coefficient. In this case, the knurl 55 of the small diameter part 54 is given a smaller external diameter than that of the intermediate part 43E. In the mirror body 11, on the other hand, the shaft hole 34 of the inner shaft receiving part 32 is given a smaller diameter than that of the shaft hole 33 of the outer shaft receiving part 31.

Figure 9B:
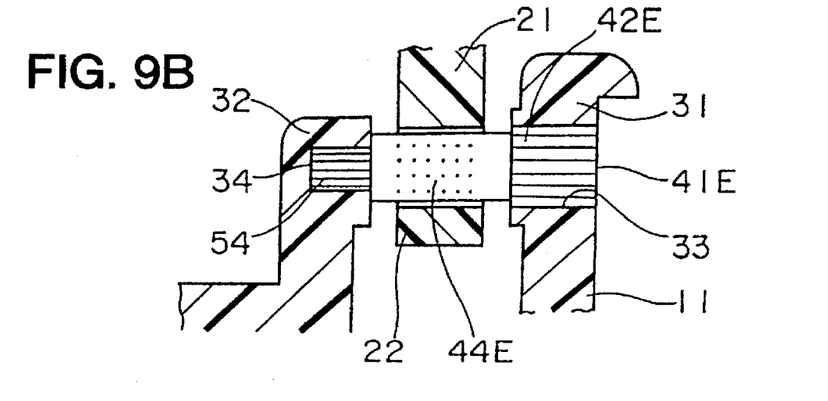

As a result, if the shaft 41E is forcibly inserted from the outer shaft receiving part 31 into the shaft hole 33, as shown in FIG. 9B, the large-diameter part 42E of the shaft 41E is press-fitted in the shaft hole 33 of the outer shaft receiving part 31, and the small diameter part 54 at the leading end of the shaft is press-fitted in the shaft hole 34 of the inner shaft receiving part 32, so that the shaft 41E is firmly received at two ends by the outer and inner shaft receiving parts 31 and 32, respectively. As a result, therefore, the forces for receiving the shaft 41E can be equalized and lightened at the two shaft receiving parts 31 and 32 to reduce the sizes such as the thicknesses of the shaft receiving parts 31 and 32. Incidentally, the external diameter of the knurl 55 of the small diameter part 54 is made smaller than that of the intermediate part 43E of the shaft 41E so that the knurl 55 of the small diameter portion 54 will not damage the inner face of the shaft hole 23 of the shaft receiving part 22 when the shaft 41E is inserted through the shaft hole 33 of the shaft receiving part 31 and the shaft hole 23 of the shaft receiving part 22.

Figure 10A:
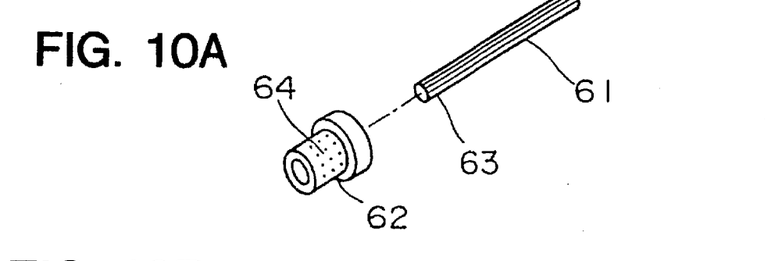
FIGS. 10A and 10B represent a perspective view of a shaft of a seventh embodiment and a section of the assembled state of the shaft, respectively.
Figure 10B:
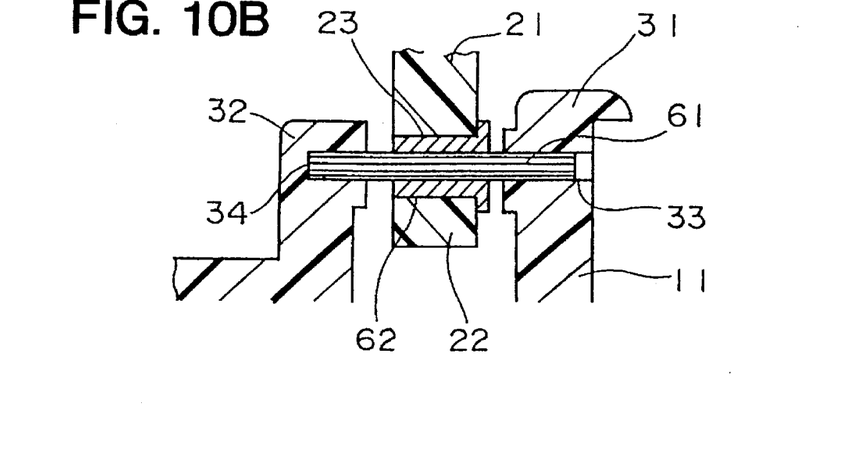

FIG. 10A shows an embodiment in which the shaft is divided into a thin pin shaft 61 made of a metal and having a circumference knurled at 63, and a collar 62 made of a resin and fitted on the pin shaft 61. The collar 62 is given a slightly smaller internal diameter than the diameter of the pin shaft 61 and has an outer circumference formed with embosses and ridges to form a friction surface part 64. Then, the collar 62 is inserted into the shaft hole 23 of the shaft receiving part 22 of the cover 21, as shown in FIG. 10B, and the pin shaft 61 is inserted through the collar 62 into the individual shaft holes 33 and 34 of the paired shaft receiving parts 31 and 32 of the mirror body 11. As a result, by the action of the knurl 63 formed on the pin shaft 61, the pin shaft 61 is press-fitted at the two end parts in the shaft holes 33 and 34 of the shaft receiving parts 31 and 32 until it is fixed in the mirror body 11.

Simultaneously, the pin shaft 61 is press-fitted and fixed in the collar 62 so that the collar 62 is fixedly received in the mirror body through the pin shaft 61. As a result, the shaft receiving part 22 of the cover 21 has a friction coefficient increased by the friction surface part 64 of the outer circumference of the collar 62 so that it can be turned at a low rate even when the spring force of the aforementioned plate spring 35 is applied. In this embodiment, further, the pin shaft 61 having the small diameter is received by the shaft receiving parts 31 and 32 so that these shaft receiving parts 31 and 32 can be small-sized to advantageously reduce the space to be occupied.

Incidentally, in the individual embodiments thus far described, the shaft is fixed and received by the mirror body so that the cover can be turned relative to the shaft. However, the shaft may be fixedly received by the cover so that it may be turned relative to the mirror body, and the shaft may be formed with the friction surface part on the surface to be brought into sliding contact with the mirror body, thereby to reduce the turning rate of the cover.

Although, moreover, the foregoing embodiments are exemplified by applying the present invention to the vanity mirror having the illumination part, the present invention can also be applied to a vanity mirror having no illumination part. In the foregoing embodiments, moreover, the molding resin is exposed as it is from the surface of the cover, but the present invention can also be applied to the cover which has the surface coated with cloth or the like.

In the present invention, furthermore, any construction other than those of the foregoing individual embodiments can be adopted as that for the large-diameter part for forming the shaft on the mirror body, if it can unify the shaft with the mirror body in the turning direction. On the other hand, the friction surface part formed on the intermediate part of the shaft may adopt any construction other than those of the aforementioned embodiments, if it increases the coefficient of friction between the friction surface part and the shaft receiving part of the cover. In this case, the coefficient of friction between the shaft receiving part of the cover and the friction surface part can be set to an arbitrary value by suitably designing the width size of the shaft receiving part of the cover, the shaft diameter and the shaft hole diameter of the shaft receiving part.

As has been described hereinbefore, according to the present invention, the cover to be turnably supported relative to the mirror body is received by the shaft which is fixed and received by the mirror body or the cover, and the shaft is formed with the friction surface part which has the friction coefficient increased on the surface to be brought into sliding contact with the shaft hole of the cover or the mirror body. As a result, the closing rate of the cover to be turned especially by the spring means can be reduced by that frictional force. Thus, even in case the spring force of the spring means is increased to enhance the quality by enhancing the stability at the instant when the cover is closed, the rate to close the cover is lowered to provide an effect that the bang or impact at the closing time can be suppressed to give a high quality to the vanity mirror.

If, moreover, the shaft is made of a resin so that a frictional force can be established between the shaft and the cover or the mirror body, the friction surface part can be formed merely as a smooth circumference to eliminate the step for forming the friction surface part, so that the shaft can be easily manufactured.

What is claimed is:

1. A vanity mirror for an automobile, comprising:
   a mirror body arranged with a mirror;
   a cover received by said mirror body;

a spring member for urging said cover in at least a closing direction; and a shaft means for rotatably supporting said cover on said mirror body, said shaft means comprising a first part and a second part, said first part being fixedly received by one of said mirror body and said cover with said second part being rotatably received by an other of said mirror body and said cover, said second part comprising a friction surface part having an enlarged friction coefficient on a surface thereof.

2. The vanity mirror according to claim 1, wherein said friction surface part of said shaft means is a smooth circumference and is made of a resin having a large coefficient of contacting friction.

3. The vanity mirror according to claim 2, wherein said friction surface part of said shaft means is formed into a smooth circumference to contact with the other of said mirror body and said cover and made of a resin having a large coefficient of contacting friction with said other.

4. The vanity mirror according to claim 2, wherein said second part of said shaft means has a circumference embossed having fine corrugations.

5. The vanity mirror according to claim 2, wherein an end of said second part of said shaft means is tapered.

6. The vanity mirror according to claim 2, wherein said first part of said shaft means is knurled on an outer circumference thereof.

7. The vanity mirror according to claim 2, wherein said first part of said shaft means comprises a large diameter part and a small diameter part with said second part provided in between said large and small diameter parts of said first part.

8. The vanity mirror according to claim 2, wherein said cover is formed of resin.

9. The vanity mirror according to claim 2, wherein said shaft means is formed of metal.

10. The vanity mirror according to claim 2, wherein said shaft means is formed of resin.

11. The vanity mirror according to claim 2, wherein an adhesive agent is applied to said first part of said shaft means.

* * * * *